US005572630A

United States Patent [19]
Azuma et al.

[11] Patent Number: 5,572,630
[45] Date of Patent: Nov. 5, 1996

[54] IMAGE FORMING APPARATUS

[75] Inventors: Takashi Azuma, Yokohama; Tsutomu Ishiguro, Isehara; Hiroshi Tanimoto, Toyokawa, all of Japan

[73] Assignee: Minolta Camera Kabushiki Kaisha, Osaka, Japan

[21] Appl. No.: 576,400

[22] Filed: Dec. 21, 1995

Related U.S. Application Data

[63] Continuation of Ser. No. 163,440, Dec. 8, 1993, abandoned.

[30] Foreign Application Priority Data

| Dec. 10, 1992 | [JP] | Japan | 4-352578 |
| Dec. 10, 1992 | [JP] | Japan | 4-352579 |
| Dec. 22, 1992 | [JP] | Japan | 4-357475 |

[51] Int. Cl.⁶ .................... G06F 15/00; H04N 1/00
[52] U.S. Cl. .................... 395/111; 395/113; 358/400; 358/404
[58] Field of Search .................... 395/111, 113

[56] References Cited

U.S. PATENT DOCUMENTS

| 4,704,636 | 11/1987 | Yano | 358/280 |
| 5,036,361 | 7/1991 | Filion | 355/209 |
| 5,129,639 | 7/1992 | Dehority | 270/1.1 |
| 5,177,544 | 1/1993 | Kimura | 355/308 |
| 5,208,681 | 5/1993 | Yoshida | 358/404 |
| 5,220,438 | 6/1993 | Yamamoto | 358/404 |

FOREIGN PATENT DOCUMENTS

| 0061426 | 4/1985 | Japan | 271/171 |
| 63-117825 | 5/1988 | Japan . | |
| 63-185752 | 8/1988 | Japan . | |
| 63-218453 | 9/1988 | Japan . | |
| 63-277150 | 11/1988 | Japan . | |
| 63-300049 | 12/1988 | Japan . | |
| 63-306139 | 12/1988 | Japan . | |

*Primary Examiner*—Sandra L. O'Shea
*Assistant Examiner*—John Ning
*Attorney, Agent, or Firm*—Brinks Hofer Gilson & Lione

[57] ABSTRACT

An image forming apparatus to prevent that the reception operation is interrupted. The image forming apparatus having a cassette for storing sheets, detecting member for detecting the quantity of sheets in the cassette, recording portion for recording images on a sheet, and controler for prohibiting the recording image by the recording portion when the detecting member detects a quantity of sheets that is less than a predetermined quantity.

19 Claims, 9 Drawing Sheets

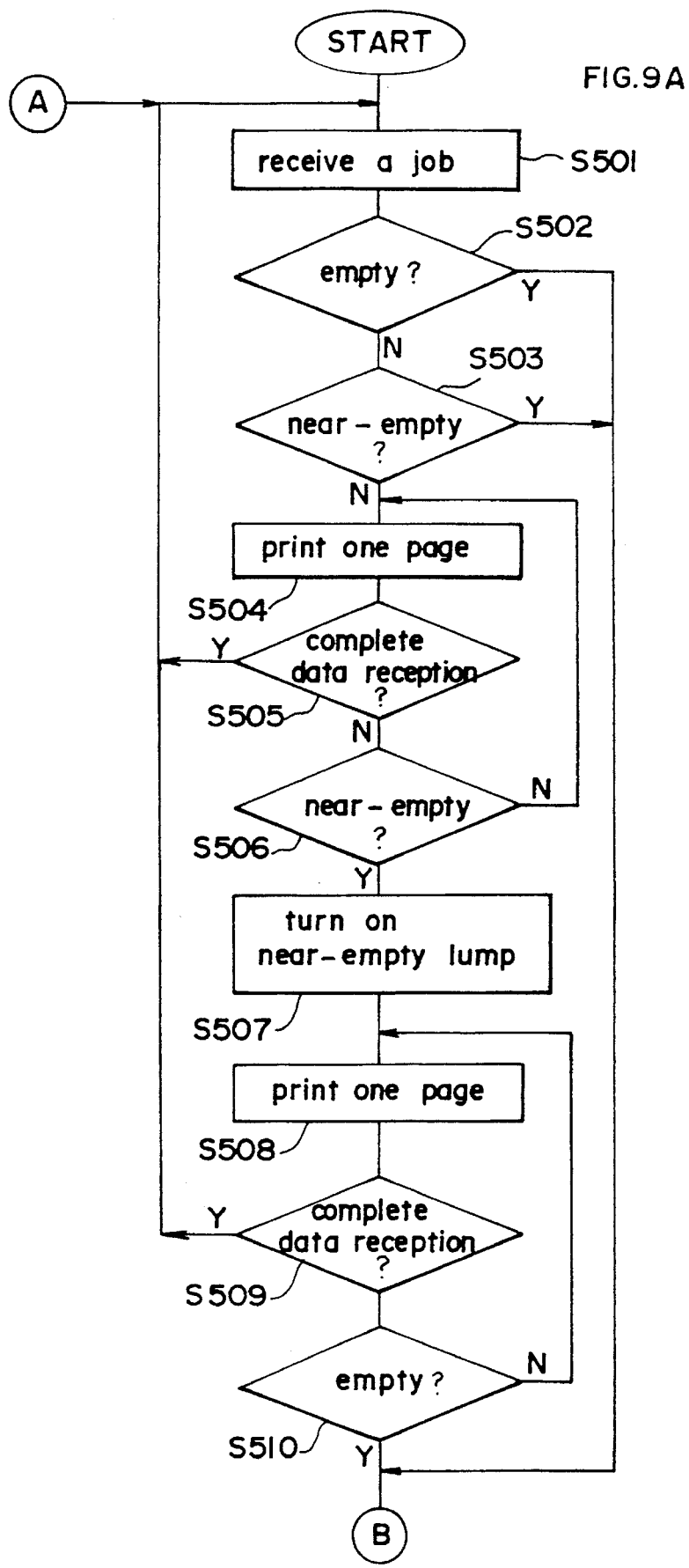

IMAGE FORMING APPARATUS

This application is a continuation of application Ser. No. 08/163,440, filed Dec. 8, 1993.

BACKGROUND OF THE INVENTION

1. Field of the Invention

The present invention relates to an image forming apparatus, and more specifically relates to an image forming apparatus for facsimile machines, printers and the like provided with a detection device to detect the number of remaining sheets.

2. Description of the Related Art

Conventional facsimile machines are provided with a paper near-empty detection device which detects and displays the number of remaining recording sheets when the number of said sheets becomes low, and a paper empty detection device which detects and displays the lack of recording sheets when no sheets are remaining. When the aforesaid paper empty detection device detects a low number of remaining recording sheets, a display or like warning assures that an operator replenishes the recording paper. When the aforesaid paper empty detection device detects a lack of recording paper, facsimile machines provided with a memory for storing reception data are capable of storing in said memory the received image data, such that the image data stored in memory may be printed after the recording paper is replenished. When the aforesaid paper empty detection device detects a lack of recording paper, facsimile machines which are not provided with a memory interrupt the reception operation until the recording paper is replenished.

When the aforesaid facsimile machines which are not provided with a memory run out of recording paper while printing a multi-page document such that the reception operation is interrupted, a signal indicating an abnormal situation is sent to the transmitting source machine. While the aforesaid printing operation is interrupted, only the document printed prior to said interruption of the printing operation can be removed. Typically, multi-page documents have the sender's name written only on the cover sheet, such that when a document printed prior to the interruption of the printing operation is removed, it becomes unclear who the sender is after the recording paper has been replenished and the remainder of the document has been printed.

The paper near-empty device for facsimile machines which use single cut sheets as the recording paper detects the position of a lifting plate upon which are disposed the copy sheets. It is difficult to accurately measure the position of the aforesaid lifting plate in the near-empty detection device, such that there is some variance as to the quantity of remaining sheets when a near empty condition is detected. Thus, in order to accurately detect the quantity of remaining sheets, a high-precision detection means must be provided to detect said quantity of remaining sheets, thereby further increasing the complexity of the overall apparatus. That is, it is extremely difficult to easily and accurately detect the quantity of remaining sheets with conventional sheet detecting devices.

SUMMARY OF THE INVENTION

A main object of the present invention is to provide an improved image forming apparatus which eliminates the previously described disadvantages.

A further object of the present invention is to provide an image forming apparatus which does not interrupt an ongoing printing operation of a multi-page document.

A still further object of the present invention is to provide capable of readily restarting a printing operation even when a document printing operation is interrupted.

An even further object of the present invention is to provide an image forming apparatus capable of easily and accurately detecting the quantity of remaining recording sheets.

In order to eliminate the previously described disadvantages, the image forming apparatus of the present invention comprises a reception means for receiving image data, recording media accommodating means for storing the recording media, recording means for recording images on a recording medium stored in said media accommodating means in accordance with said received image data, remainder detecting means for detecting the quantity of remaining recording media stored in said media accommodating means, memory means for storing said image data, and control means for storing the image data by the memory means without recording image data by the recording means based on the image data received by the reception means when the remainder detecting means detects a quantity of remaining recording media that is less than a predetermined quantity, and for continuing the recording by the recording means when the remainder detecting means detects a quantity of recording media that is less than a predetermined quantity after said recording means has started recording the image.

The image forming apparatus of the present invention further comprises a reception means for receiving image data, recording media accommodating means for storing recording media, recording means for recording images on a recording medium stored in said media accommodating means in accordance with said received image data, remainder detecting means for detecting the quantity of remaining recording media stored in said media accommodating means, memory means for storing said image data, first control means for storing the image data by the memory means without recording said image data by the recording means based on the image data received by the reception means when the remainder detecting means detects a quantity of remaining recording media that is less than a predetermined quantity, and second control means for starting the recording by the recording means even when the quantity of remaining recording media is less than a predetermined quantity.

The image forming apparatus of the present invention further comprises an accommodating means for storing recording media, detection member formed so as to be insertable between recording media stored in said accommodating means, and detection means for detecting the presence of said detection member on the uppermost recording medium.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 9A and 9B are a flow chart showing the general operation of the facsimile apparatus;

DESCRIPTION OF THE PREFERRED EMBODIMENTS

Figure 1:
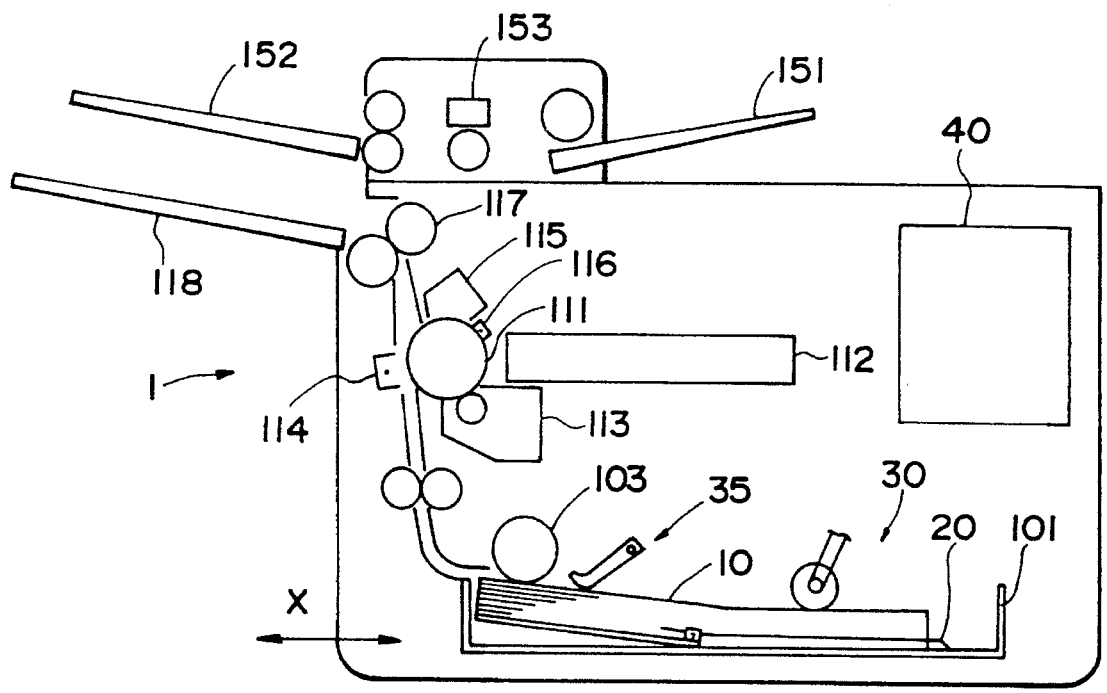
FIG. 1 is a section view showing the general construction of a facsimile apparatus of the current invention.

In FIG. 1, the facsimile machine 1 is provided with a paper cassette (recording media accommodating means) 101 which accommodates a plurality of sheets (recording media) 10 that are of a specific cut size. The paper cassette 101 is removable from the front of the apparatus by pulling in the arrow X direction as indicated in the drawing, such that sheets 10 can be resupplied in the paper cassette 101 when said cassette is removed from the apparatus.

One end of a detection sheet 20 is fixedly anchored within the paper cassette 101, the other end of said detection sheet 20 is interposed between the stacked sheets 10. A near-empty sensor (remaining sheet quantity detecting means) 30 is arranged on the top of the paper cassette 101. The near-empty sensor 30 detects when the number of sheets 10 accommodated in the cassette 101 becomes less than a predetermined number by detecting the detection sheet 20. An empty sensor (remaining sheet quantity detecting means) 35 is provided at the top of the paper cassette 101 to detect a lack of sheets 10 in said cassette 101.

A take-up roller 103 is provided at the top of the paper cassette 101 opposite the paper feed path to feed the sheets 10 accommodated in said cassette 101 one sheet at a time. A photosensitive drum 111 is disposed above the aforesaid sheet feeding path. Provided around the photosensitive drum 111 are a laser optical unit 112 comprising a semiconductor laser, polygonal mirror and the like, developing means 113, transfer charger 114, cleaner 115, and charger 116. An image is formed on a sheet 10 by forming a toner image by a well known electrophotographic method on the surface of the photosensitive drum 111, and transferring said toner image onto said sheet 10.

The toner adhered to the sheet 10 is thermally fused on said sheet 10 by a heat fixing device 117, and said sheet 10 is discharged onto the discharge tray 118. A controller 40, described later, is also provided within the facsimile apparatus 1.

A reading section is provided on the top of the facsimile 1 for reading original documents. This reading section reads an original document placed on the tray 151 via the charge-coupled device (CCD) 153 as said original document is transported to the tray 152. The signals output from the CCD 153 are binarized, and thereafter transmitted as image data to the reception side of the facsimile apparatus via a telephone circuit.

Figure 2:
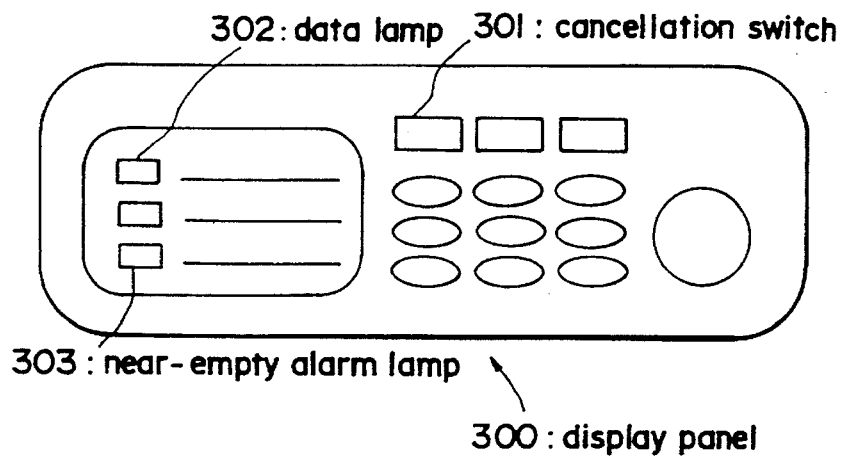
FIG. 2 is an elevation view showing the display panel of the facsimile apparatus.

FIG. 2 is an elevation view showing the display panel 300 of the facsimile apparatus 1 of the present invention. The display panel 300 is provided on the top of the facsimile apparatus 1, and comprises various types of switches and display light-emitting diodes (LED) and the like. In the drawing, reference numeral 301 refers to a cancellation switch, that is operated by a user when a printing operation is interrupted due to a near-empty condition and the user wants to print on the recording paper remaining in the cassette 101. The data lamp 302 is lighted when image data transmitted from the transmission side of the facsimile apparatus 1 is maintained in the memory provided within the controller 40. The near-empty alarm lamp 303 is lighted when the number of recording sheets remaining in the cassette 101 and the near-empty sensor 30 has entered the ON state. When a user replenishes the recording paper in accordance with the lighting of the data lamp 302 or the lighting of the near-empty alarm lamp 303, the document (image) is recorded on the replenished recording paper based on said stored image.

Figure 3:
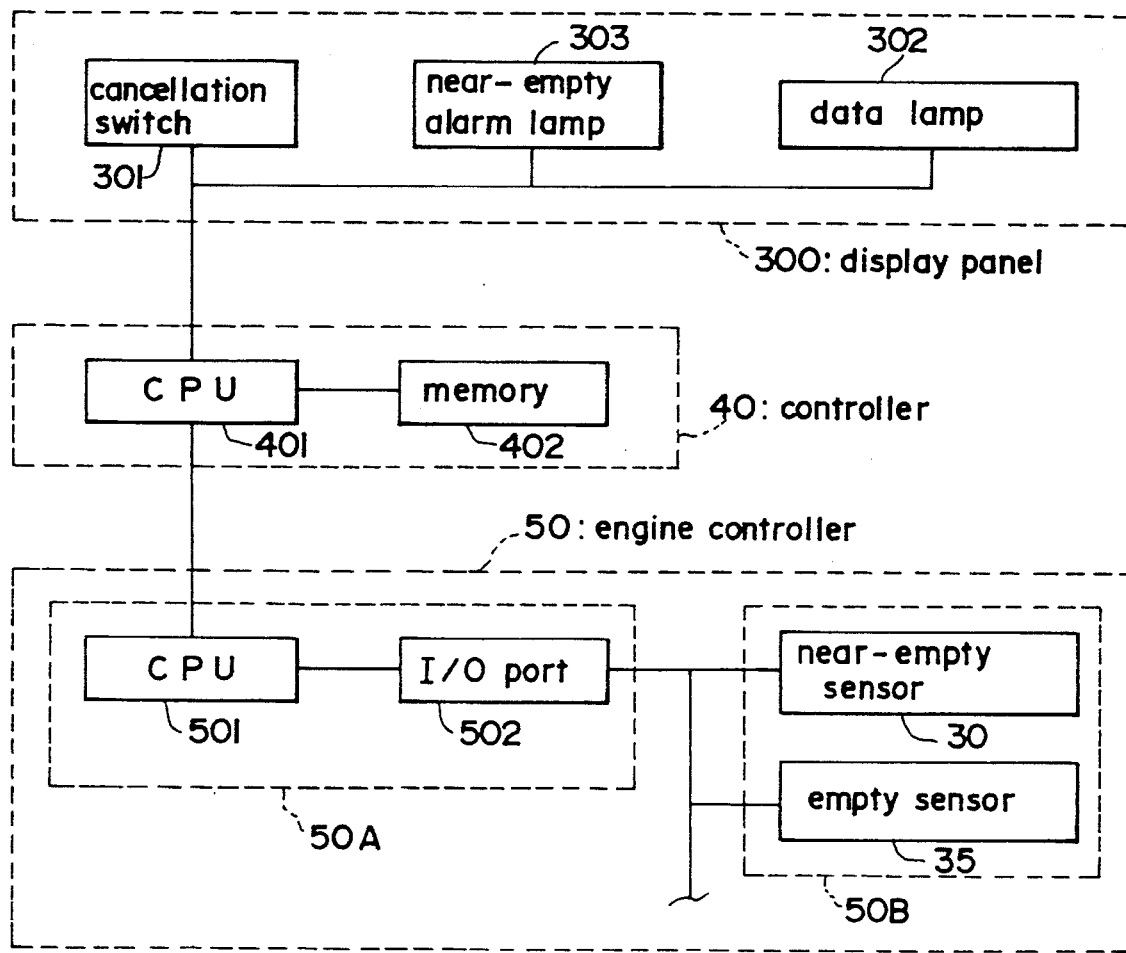
FIG. 3 is a block diagram of the controller of the facsimile apparatus.

FIG. 3 is a block diagram of the controller 40 and the like. The display panel 300 and the engine controller 50 are connected to the controller 40 via data buses. The central processing unit (CPU) 401 of the controller 40 has the functions of controlling the display panel 300, and accomplishing data transmission with the engine controller 50. The memory 402 is provided with a memory or the like for storing the received image data.

The engine controller 50 controls the printing devices such as the laser optical unit 112, developing means 113 and the like, and comprises a control section 50A including a CPU 501 and input/output (I/O) port 502 and the like, and a sensor section 50B including a near-empty sensor 30 and empty sensor 35 and the like. Signals from the near-empty sensor 30, empty sensor 35 and like sensors of the sensor section 50B are input to the CPU 501 via the I/O port 502. These signals are output as status data to the controller 40 via the CPU 501.

Figure 4:
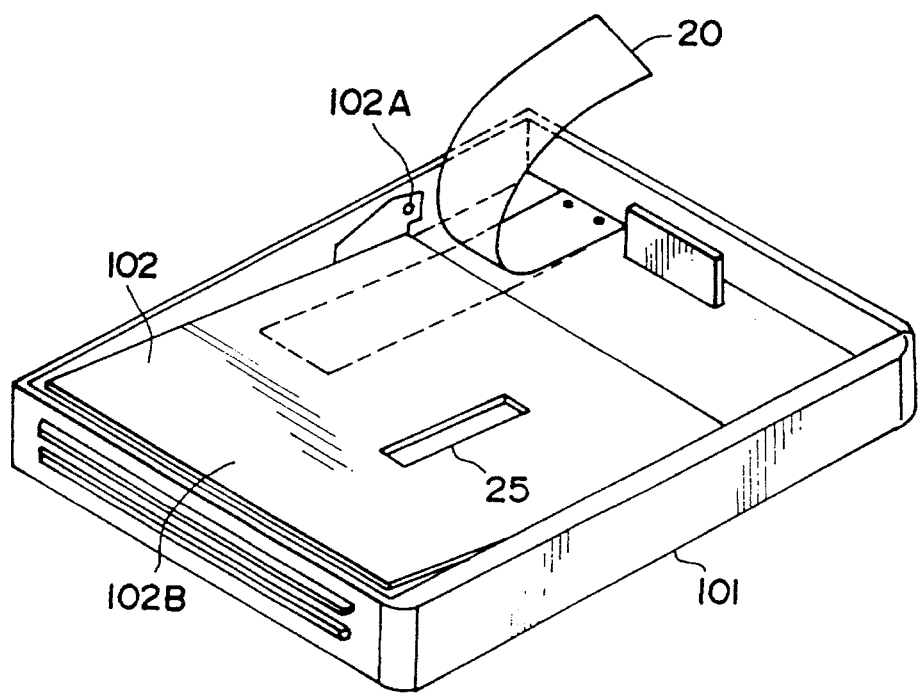
FIG. 4 is a perspective view of the paper cassette.

FIG. 4 is a perspective view of the paper cassette 101 provided with a detection sheet 20. The detection sheet 20 is narrow and rectangular in shape with one end fixedly anchored to the interior of the cassette 101 at a rear position. The detection sheet 20 is formed of a flexible material, and is constructed so as to be freely bendable upon a pivot of the aforesaid anchored end thereof. A detection slot 25 is provided on the lifting plate 102 at a position opposite the empty sensor 30.

When sheets 10 are supplied in the paper cassette 101, the detection sheet 20 is first lifted upwardly, whereupon a desired number of recording sheets 10 (e.g., 20 to 30 sheets) are stacked on the lifting plate 102. The number of sheets 10 which can be printed after near-empty detection may be optionally set by suitably changing the aforesaid number of sheets 10 stacked beneath the detection sheet 20. After the detection sheet 20 is placed on top of the aforesaid sheets 10, a plurality of further sheets 10 are stacked thereon. That is, the detection sheet 20 is interposed between the stacked sheets 10.

The lifting plate 102 is supported on an interior wall of the paper cassette 101 so as to be freely rotatable on one end thereof via two shafts 102A (only one side shown in FIG. 4). When the paper cassette 101 is loaded in the facsimile apparatus 1 after sheets 10 are stacked on the lifting plate 102, the front end 102B of the lifting plate 102 rises so as to bring the front edge of the sheet 10 into contact with the take-up roller 103. In this state, when all the sheets 10 stacked on the lifting plate 102 are fed via the take-up roller 103 such that the front end of the empty sensor 35 engages the detection slot 25, the front end of said empty sensor 35 moves the lifting plate 102 in a downward direction. The lack of sheets 10 is detected via the movement of the empty sensor 35.

Figure 5:
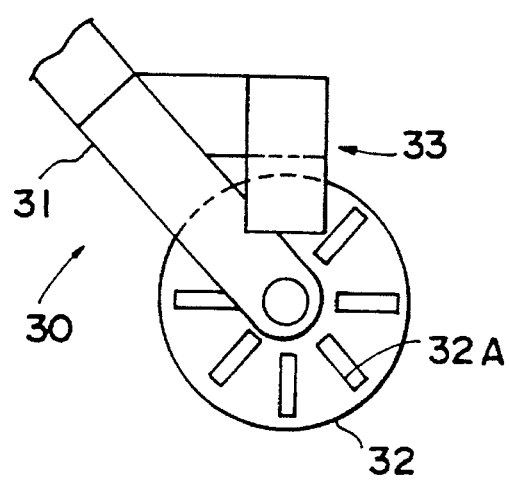
FIG. 5 is a side view showing the construction of near-empty sensor.
Figure 6:
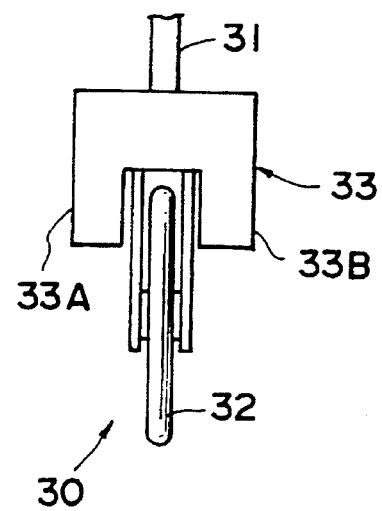
FIG. 6 is a front view showing the construction of the near-empty sensor.

FIG. 5 is a side view of the near-empty sensor 30, and FIG. 6 is a front view of the near-empty sensor 30. In these drawings, A roller 32 is mounted on the bottom end of the arm 31 so as to be freely rotatable. This roller 32 is provided with a plurality of slits 32A radiating from the center thereof in spoke-like extensions, and an inverted U-shaped photosensor 33 is fixedly attached to the arm 31 so as to straddle the roller 32.

The photosensor 33 comprises a photoemitter section 33A having photoemitter element such as an LED or the like, and a photoreceptor section 33B having a photoreceptor element such as a phototransistor or the like. Thus, the light emitted form the photoemitter section 33A reaches the photoreceptor section 33B only when the a slit 32A of the roller 32 is positioned between said photoemitter section 33A and the photoreceptor section 33B. When the roller 32 is rotated, the light emitted from the photoemitter section 33A intermittently arrives at the photoreceptor section 33B, which outputs a pulse-like signal. These signals are input to the CPU 501, which determines whether a near-empty condition is indicated or the roller 32 has stopped during the paper supply operation based on the aforesaid output signal of the photoreceptor section 33B.

Figure 7:
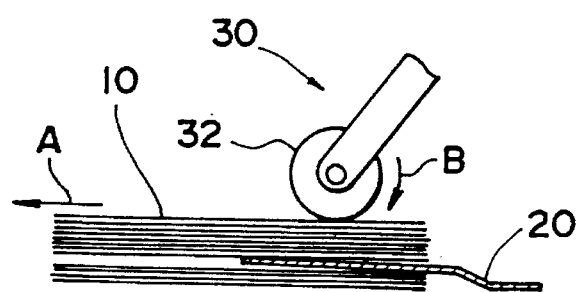
FIG. 7 is an illustration showing the operating state of the near-empty sensor.
Figure 8:
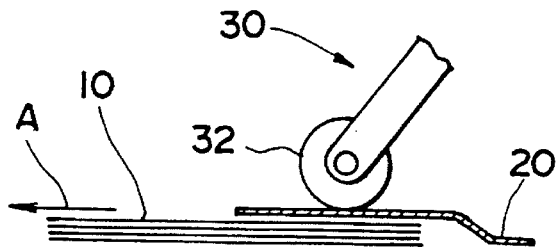
FIG. 8 is an illustration showing the operating state of the near-empty sensor.

More specifically, when the number of remaining sheets 10 is adequate as shown in FIG. 7 (when sheets 10 are placed on top of the detection sheet 20), and the sheets 10 are fed in the arrow A direction via the take-up roller 103, the roller 32 is rotated in the arrow B direction via said contact with the sheet 10. In conjunction with the rotation of the roller 32, pulse-like signals are output from the photoreceptor section 33B of the near-empty sensor 30. In accordance with these signals, the CPU 501 determines whether or not the quantity of remaining recording sheets 10 is sufficient. As shown in FIG. 8, when the quantity of remaining recording sheets 10 is depleted and the surface of the detection sheet 20 is exposed, the roller 32 of the near-empty sensor 30 comes into contact with the detection sheet 20. In this state, the roller 32 does not rotate even though the take-up roller 103 transports the sheet 10 in the arrow A direction, and, therefore, the pulse-like signal is not output from the photoreceptor section 33B. The CPU 501 determines a near-empty condition based on the aforesaid signal.

Since the near-empty sensor 30 detects the detection sheet 20 interposed between the stacked sheets 10, it is possible to accurately detect the quantity of remaining sheets 10 which reaches a previously set number. For example, when the detection sheet 20 is positioned among the sheets 10 stacked in the cassette 101 such that 30 sheets 10 are below said detection sheet 20, a near-empty condition can be accurately detected when the quantity of remaining sheets 10 is 30 sheets. The near-empty sensor 30 may be such that, the roller 32 presses against the sheet 10 via gravity, or the roller 32 presses against the sheet 10 via the force of a spring or the likes acting upon the near-empty sensor 30. Furthermore, the number of sheets which can be printed after the detection of a near-empty condition can be readily set at an optional desired number because the number of sheets 10 placed beneath the detection sheet 20 can be suitably varied by a user. That is, the quantity of sheets remaining when the near-empty condition is detected can be optionally set.

Figure 9B:
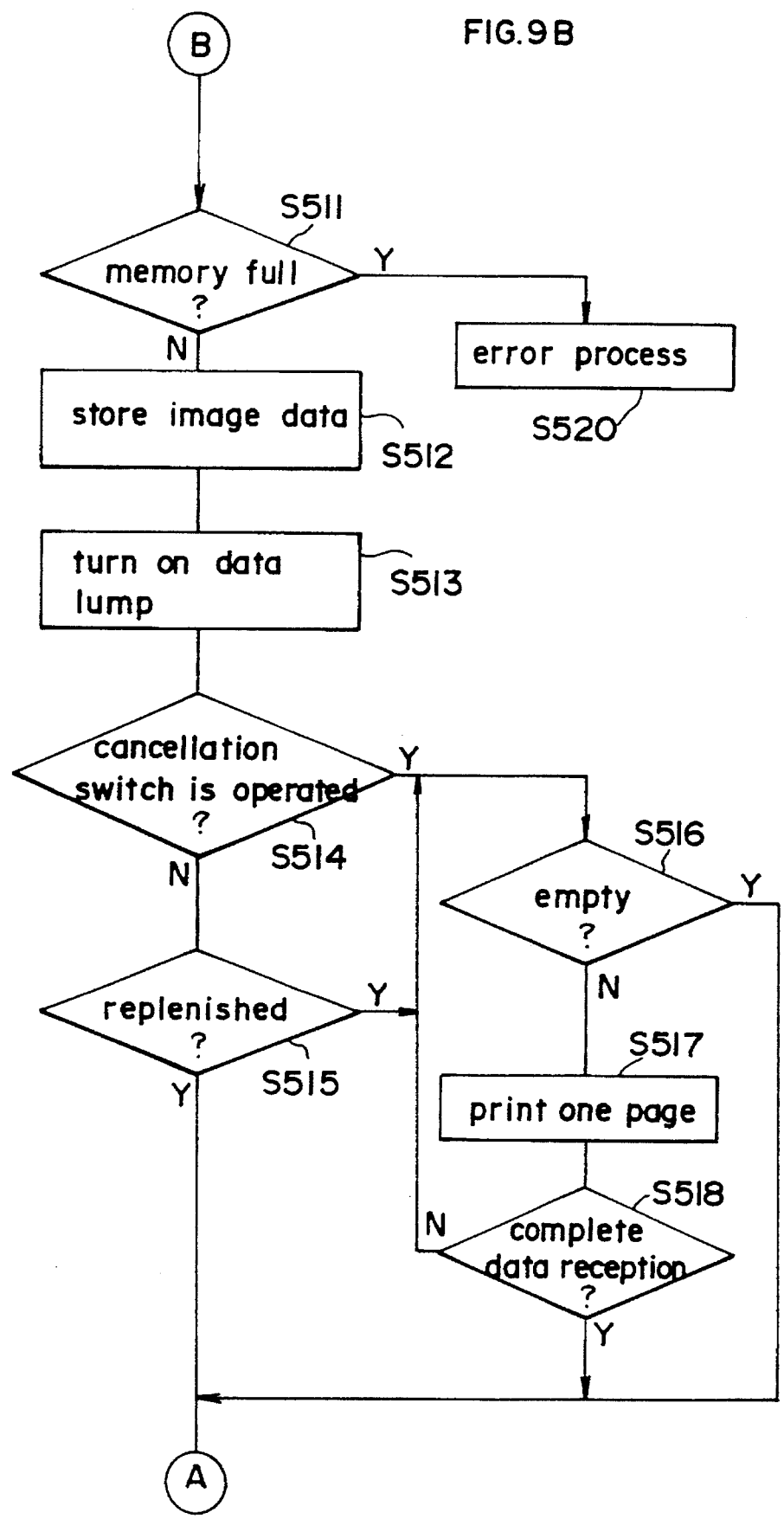

The operation of the facsimile apparatus of the present invention is described hereinafter with reference to the flow chart of FIGS. 9A and 9B.

When the controller 40 receives data from a remote facsimile machine, i.e., remote transmission source (step S501), a check is made to determine whether or not recording sheets 10 are present in the cassette 101 based on the output of the near-empty sensor 30 (step S502). When recording sheets are present (step S502: NO), a check is made to determine whether or not the number of sheets accommodated in the cassette 101 is less than a predetermined value based on the output of the near-empty sensor 30 (step S503). When the aforesaid quantity is greater than the previously set value, the image data of one page is printed (step S504).

Then, a check is made to determine whether or not image data reception is complete (step S505). If said reception has been completed, the routine returns to step S501, and the apparatus waits for the reception of new data. However, if image data reception has not been completed (step S505: NO), a determination is made as to the quantity of remaining sheets based on the output of the near-empty sensor 30 (step S506). When sufficient sheets remain in the cassette 101 (step S506: NO), the routine returns to step S504, and the printing operation continues. On the other hand, when few sheets remain in the cassette 101 and a near empty condition is detected by the near-empty sensor 30 (step S506: YES), the near-empty alarm is lighted to alert a user to the near empty condition (step S507). Thereafter, one page of image data is printed (step S508), and subsequently a check is made to determine whether or not the image data reception is complete (step S509). When it is determined that data reception has been completed, the routine returns to step S501, and the apparatus awaits the incoming transmission of new data. On the other hand, when data reception is not complete (step S509: NO), a check is made to determine whether or not sheets 10 are present in the cassette 101 based on the output of the empty sensor 35 (step S510). When sheets 10 remain in the cassette 101 (step S510: NO), the routine returns to step S507, and the printing operation continues.

When the empty sensor 35 detects no sheet 10 in the cassette 101 (step S502, S510: YES), and when a near empty condition is determined in step S503, a check is made to determine whether or not empty areas are available in the memory 402 or if said memory is full (step S511). If the memory 402 is full (step S510: YES), the CPU 401 executes a predetermined error process (step S520). If free areas are available in memory 402 (step S511: NO), the CPU 401 holds the as yet unprinted image data in the memory 402 (step S512), and lights the data lamp 302 (step S513).

Then, the CPU 401 determines the state of the cancellation switch 301 (step S514). When the cancellation switch 301 has not been operated by a user and is in the OFF state (step S514: NO), the CPU 401 determines whether or not the recording sheets have been replenished by a user (step S515). When the recording sheets have not been replenished (step S515: NO), the routine returns to step S501 without executing a printing operation, and the apparatus awaits the incoming transmission of a job.

On the other hand, when a user has operated the cancellation switch 301 (step S514: YES), and when the replenishment of the recording sheets in the cassette 101 has been detected by the removal of the cassette 101 (step S515: YES), a determination is made as to whether or not recording sheets 10 are present in the cassette 101 via the empty sensor 35 (step S516). If recording sheets 10 are present in the cassette 101 (step S516: NO), the image data stored in the memory 402 is printed on a sheet 10 (step S517). When as yet unprinted image data remain in the memory 402 (step S518: NO), the routine returns to step S516, and a printing operation is executed if recording sheets 10 are present in the cassette 101 (step S517). Thereafter, when the printing of the image data stored in the memory 402 is completed (step S518: YES), the routine returns to step S501 after extinguishing the near-empty alarm lamp 303, and the apparatus awaits the incoming transmission of data from a remote facsimile machine.

As previously described, if a near empty condition exists when data are received by the facsimile 1, all of said data are stored in the memory 402 without executing a printing operation, and the printing operation is started only after the recording sheets 10 have been replenished in the cassette 101. After data has been received and the printing operation started, said printing operation is continuous even if a near empty condition is detected. Accordingly, there is no interruption of the printing operation of a multi-page document. Furthermore, a printing operation can be started via the operation of the cancellation switch 301 without replenishing the recording sheets, even when a printing operation is interrupted due to the detection of a near empty condition.

Figure 10A:
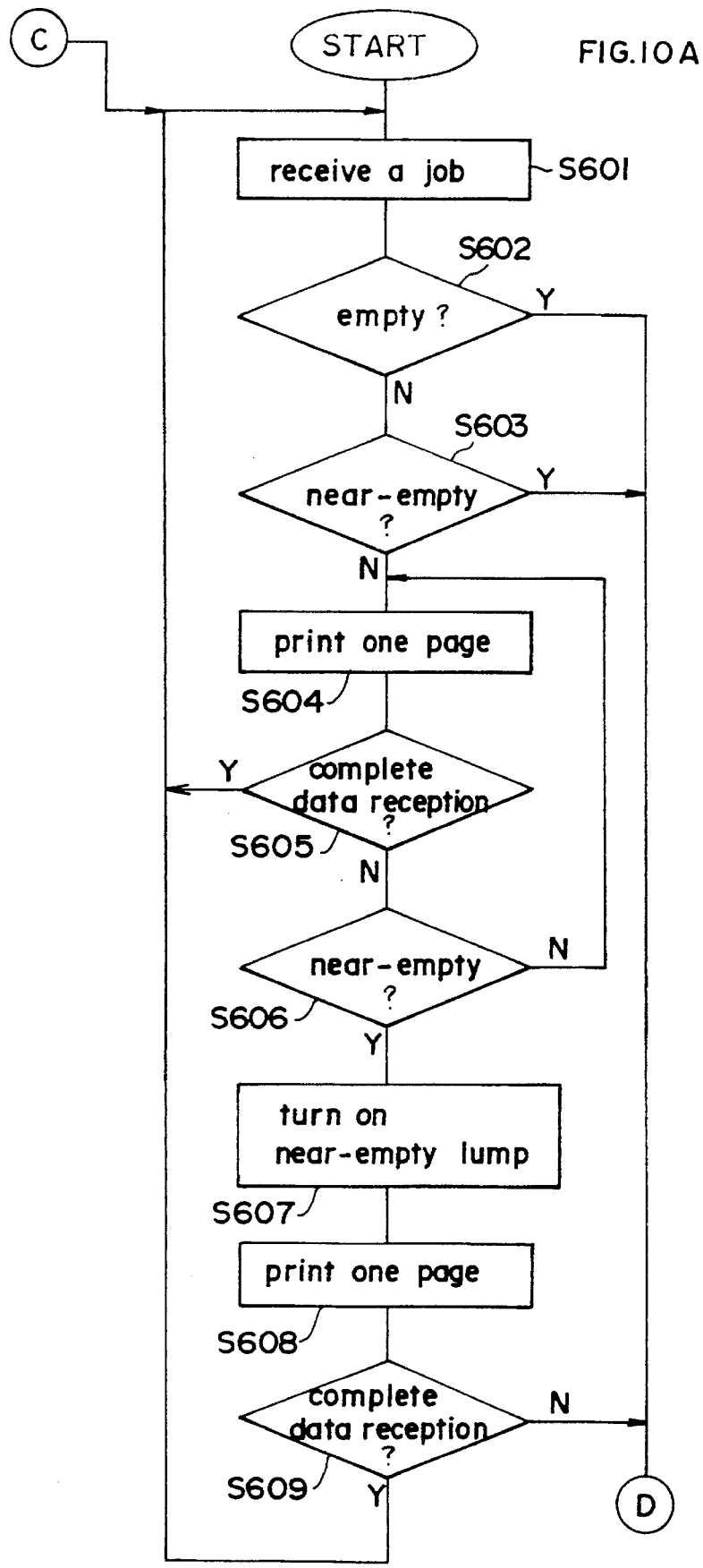
FIGS. 10A and 10B are a flow chart showing other operations of the facsimile apparatus.
Figure 10B:
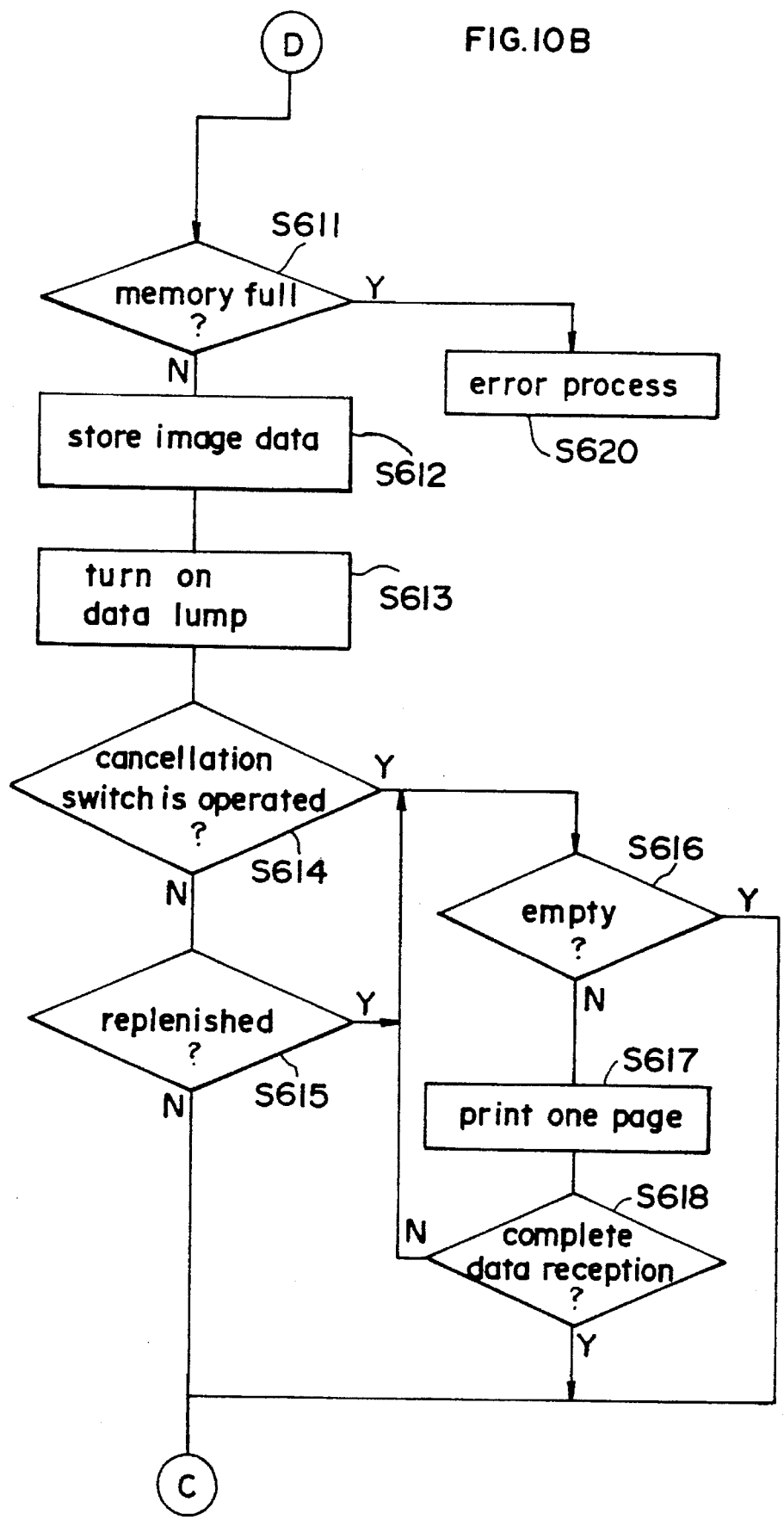

The operation of the facsimile apparatus of the present embodiment may be further described by means of the flow chart of FIGS. 10A and 10B. This flow chart differs from the previously describe flow chart of FIGS. 9A and 9B in that a jump advance occurs in step S611 when a NO reply is obtained to the query of step S609. That is, according to this flow chart, when a near empty condition is detected (step S606), the near-empty alarm lamp 303 is lighted (step S607) and one page of image data are printed, and thereafter, when incoming image data are transmitted (step S609: NO), said subsequent image data are stored in memory 402 (steps S611, S612). All other processes are identical to those described in the flow chart of FIGS. 9A and 9B.

In facsimile apparatus of the previously described electrophotographic type, since toner is a consumable material in the same manner as recording sheets, the amount of remaining toner may be detected the operations described in the flow chart. That is, when the amount of remaining toner is low, a portion of a multi-page document can be prevented from having an unclear recipient destination by executing processing to store the transmitted image data in memory 402 or the like (steps S611, S612). Other processes are identical to those described in the flow chart of FIGS. 9A and 9B.

Although a plurality of sheets cur to specific size are used as the recording paper in the present embodiment, it is to be noted that a continuous paper of a roll-type also may be used as the recording paper. Furthermore, a method other than the previously described heat-sensitive type using a thermal head may be used as the recording method.

The first embodiment has been described in terms of determining a near empty condition by detecting the rotational state of roller 32. A second embodiment wherein an electrically conductive member ia interposed between the recording sheets 10, and a near empty condition is detected by changes in the conductive state is described hereinafter with reference to FIGS. 11, 12 and 13.

Figure 11:
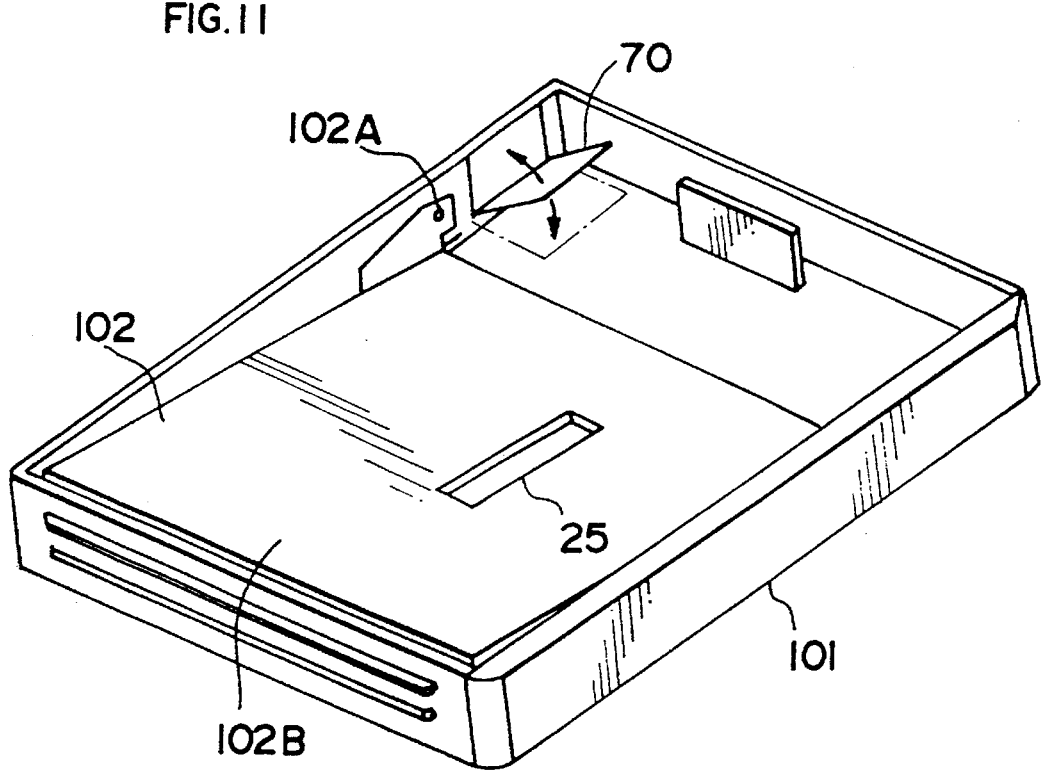
FIG. 11 is a perspective view showing another paper cassette using a near-empty sensor of a second embodiment of the invention.

FIG. 11 is a perspective view of the paper cassette provided with a conductive plate. One edge of the rectangular-shaped electrically conductive plate 70 is mounted on the interior wall of the paper cassette 101, so as to be rotatable about said edge which functions as an axis. When a user replenishes the sheets 10 accommodated in the cassette 101, the conductive plate 70 is first lifted, and a predetermined number of sheets 10 are placed in the cassette 101. At this time, the number of loaded recording sheets 10 is the number of sheets which can be printed after a near empty condition is detected. Thereafter, the conductive plate 70 is pushed down and more sheets 10 are loaded. The lifting plate 102 is constructed identically to that of the previously described first embodiment.

Figure 12:
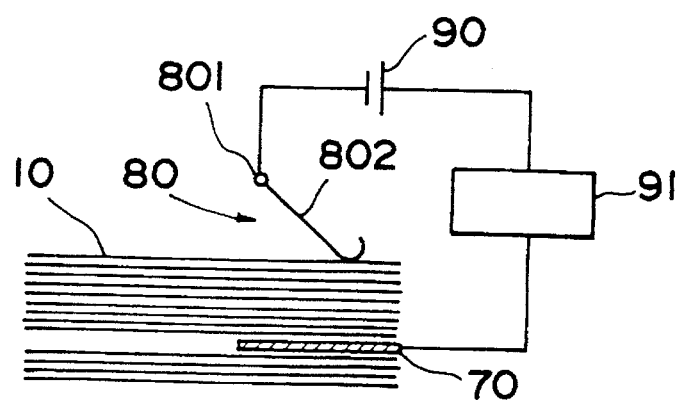
FIG. 12 is an illustration showing the operating state of the near-empty sensor of the second embodiment.
Figure 13:
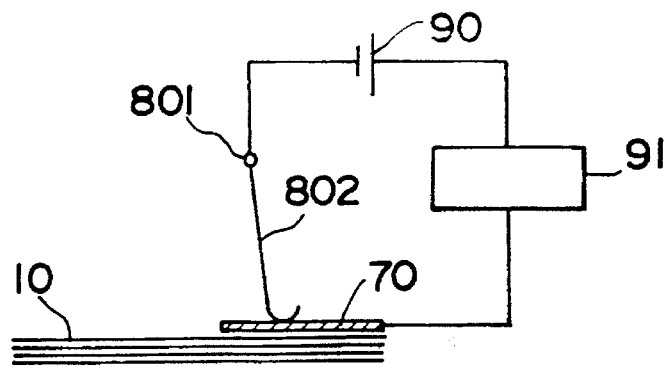
FIG. 13 is an illustration showing the operating state of the near-empty sensor of the second embodiment.

FIGS. 12 and 13 are illustrations showing the near-empty sensor of the second embodiment. The near-empty sensor 80 is provided on top of the conductive plate 70 of a cassette 101 installed in the facsimile apparatus 1. The near-empty sensor 80 comprises a shaft 801 and wire 802 with conductive characteristics. The leading ends of the wire 802 is curved in a U-shaped configuration which is in contact with the stacked sheets 10. The wire 801 is serially connected to a power unit 90, detection circuit 91, and the conductive plate 70. The near-empty sensor 80 and the conductive plate 70 comprise a switch which are constructed such that, when both make contact, electrical current is supplied to the closed circuit formed by the power unit 90, detection circuit 91, and conductive plate 70. The detection circuit 91 is capable of detecting whether or not electric current is flowing within said detection circuit 91.

When the quantity of remaining sheets 10 is adequate (i.e., when sheets 10 are stacked on top of the conductive plate 70), said sheets 10 form an insulative member interposed between the wire 802 and the conductive plate 70, as shown in FIG. 12, such that said wire 802 and said conductive plate 70 are in a non-conductive state. In this non-conductive state, electric current does not flow in the detection circuit 91, and said detection circuit 91 thus determines that an adequate quantity of sheets 10 remain.

When the sheets 10 become depleted so as to expose the surface of the conductive plate 70, as shown in FIG. 13, the wire 802 makes contact with the conductive plate 80 such that said wire 802 and said conductive plate 70 enter a conductive state. In this conductive state, electric current flow in the detection circuit 91, and said detection circuit 91 thus detects a near empty condition.

Figure 14:
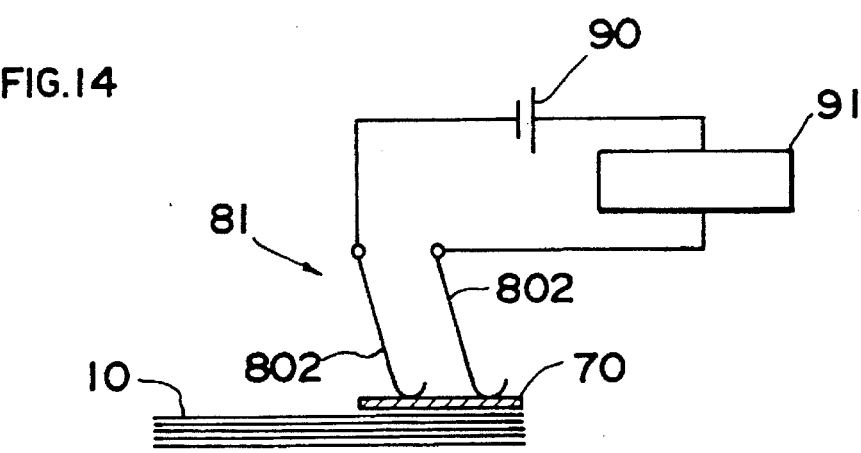
FIG. 14 is an illustration showing the construction of a near-empty sensor of a third embodiment.

FIG. 14 is an illustration showing the near-empty sensor of a third embodiment. The near-empty sensor 81 is provided with two individual wires 802 which are constructed such that a current flows in the detection circuit 91 when both wires 802 are in contact with the conductive plate 70. Otherwise the construction and effects of the third embodiment are identical to those of the second embodiment.

Figure 15:
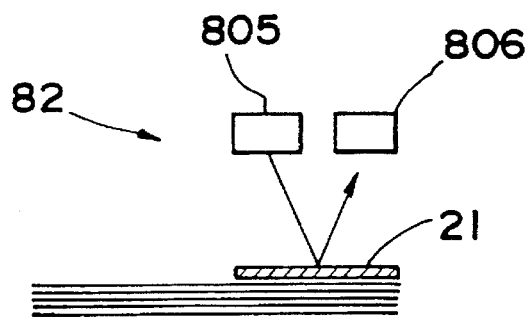
FIG. 15 is an illustration showing the construction of a near-empty sensor of a fourth embodiment.

FIG. 15 is an illustration showing the near-empty sensor of a fourth embodiment. The near-empty sensor 82 comprises a photoemitter section 805 formed of an LED or the like which expose a light on the stacked sheets 10, and a photoreceptor section 806 formed of a phototransistor or the like which receives the reflected light from the sheets 10. In the paper cassette 101 is provided a detection sheets 21 which has a reflectance rate that differs from the reflectance rate of the sheets 10. In the near-empty sensor 82, when the sheets 10 are depleted and the detection sheet 21 is exposed, the intensity of the light received by the photoreceptor section 806 changes, thereby making it possible to detect the depleted state of the sheets 10.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:

a sheets cassette which stores sheets;

a detector which detects whether a quantity of remaining sheets stored in said sheets cassette is less than a predetermined quantity or not;

a receiver which receives image data;

a recording device which records images on the sheets stored in said sheets cassette in accordance with said received image data; and a controller which prohibits the recording of image data by the recording device based on the image data received by the receiver at an end of a currently recording job after the detector detects that said quantity of remaining sheets is less than the predetermined quantity.

2. An apparatus according to claim 1, wherein the controller controls the recording device to continue to record the image data of the currently recording job in order to complete the recording of the currently recording job even if the detector detects a quantity of remaining sheets that is less than the predetermined quantity after said recording device has started recording the image data.

3. An apparatus according to claim 1, further comprising:

a memory which stores received image data following the image data of the currently recording job when said controller prohibits the recording of image data by the recording device at the end of the currently recording job.

4. An apparatus according to claim 1, wherein the detector includes a detection member formed so as to be insertable between sheets stored in said sheets cassette and a detection device which detects the presence of said detection member on an uppermost sheet.

5. An apparatus according to claim 4, wherein the detection device detects movement of the uppermost sheet when the uppermost sheet is fed.

6. An apparatus according to claim 4, wherein the detection member comprises an electrically conductive plate, and the detection device detects the presence of remaining sheets by changes in conductive state.

7. An apparatus according to claim 4, wherein the detection member has a reflectance rate that differs from the reflectance rate of the sheets, and the detection device detects the presence of remaining sheets by intensity of light received from the detection member.

8. An image reading apparatus comprising:

a receiver which receives image data;

a sheets cassette which stores sheets;

a recording device which records images on the sheets stored in said sheets cassette in accordance with said received image data;

a detector which detects whether a quantity of remaining sheets stored in said sheets cassette is less than a predetermined quantity or not;

a memory which stores said image data; and a controller which controls said recording device, wherein said recording device is prohibited from recording the image data and said received image data is stored in said memory when the detector detects that said quantity of remaining sheets is less than the predetermined quantity before said recording device starts recording the images, and wherein said recording device records the image continuously until the recording of a currently recording job is completed even if the detector detects that said quantity of remaining sheets is less than the predetermined quantity after said recording device has started recording the images, and then prohibits recording the image data following the image data of the currently recording job.

9. An apparatus according to claim 8, further comprising:

an input button which commands the controller so as to record continuously when the detector detects that said quantity of remaining sheets that is less than a predetermined quantity before said recording device starts recording the images.

10. An apparatus according to claim 3, wherein the controller resumes recording the received image data stored in the memory based on replenishment of the sheets cassette with sheets.

11. An image forming apparatus comprising:

a sheets cassette which stores recording sheets;

a detection member formed so as to be insertable between recording sheets stored in said sheets cassette for monitoring said recording sheets; and a detector which detects the presence of said detection member on an uppermost recording sheet.

12. An apparatus according to claim 11, wherein the detector detects movement of the uppermost sheet when the uppermost sheet is fed.

13. An apparatus according to claim 11, wherein the detection member comprises an electrically conductive plate, and the detector detects the presence of remaining sheets by changes in conductive state.

14. An apparatus according to claim 11, wherein the detection member has a reflectance rate that differs from the reflectance rate of the sheets, and the detector detects the presence of remaining sheets by intensity of light received from the detection member.

15. An image forming apparatus comprising:

a sheets cassette which stores sheets;

a first detector which detects whether a quantity of remaining sheets stored in the sheets cassette is less than a predetermined quantity or not;

a second detector which detects whether the sheets cassette is empty or not;

a receiver which receives image data;

a recording device which records images on the sheets stored in the sheets cassette in accordance with the received image data; and a controller which controls said recording device, wherein said recording device continues to record the image data of a currently recording job until completion thereof and then prohibits recording the image data following the image data of the currently recording job when the first detector detects that the quantity of remaining sheets is less than the predetermined quantity, and wherein said recording device prohibits recording the image data of the currently recording job at the end of a currently recording page when the second detector detects that the sheets cassette is empty during the continuation of the recording of the currently recording job.

16. An apparatus according to claim 15, further comprising:

a memory which stores received image data following the image data of the currently recording page when the controller prohibits the recording of image data by the recording device at the end of the currently recording page.

17. An apparatus according to claim 15, wherein the controller resumes recording the received image data stored in the memory based on replenishment of the sheets cassette with sheets.

18. An apparatus according to claim 8, wherein the controller resumes recording the received image data stored in the memory based on replenishment of the sheets cassette with sheets.

19. An image forming apparatus comprising:

a sheets cassette which stores sheets;

a detector which detects whether a quantity of remaining sheets stored in said sheets cassette is less than a predetermined quantity or not;

a receiver which receives image data;

a recording device which records images on the sheets stored in said sheets cassette in accordance with said received image data; and a controller which controls said recording device so as to continue to record the image data of a currently recording job until completion thereof even when the detector detects that said quantity of remaining sheets is less than the predetermined quantity, and then to prohibit recording the image data following the image data of the currently recording job.

* * * * *